United States Patent
Matsuyama

[11] Patent Number: 6,142,374
[45] Date of Patent: Nov. 7, 2000

[54] OPTICAL CHARACTER READER

[75] Inventor: Yoshiyuki Matsuyama, Yokohama, Japan

[73] Assignee: Matsushita Electric Industrial Co., Ltd., Osaka, Japan

[21] Appl. No.: 09/009,181

[22] Filed: Jan. 20, 1998

[30] Foreign Application Priority Data

Jan. 20, 1997 [JP] Japan ..................................... 9-007280
Feb. 4, 1997 [JP] Japan ..................................... 9-034266

[51] Int. Cl.[7] ....................................................... G06K 7/14
[52] U.S. Cl. ............................................ 235/454; 235/455
[58] Field of Search ................................... 235/454, 455; 382/173

[56] References Cited

U.S. PATENT DOCUMENTS 5,907,630  5/1999  Naoi et al. ............................... 382/173

FOREIGN PATENT DOCUMENTS

3-282895  12/1991  Japan .
5-101219  4/1993  Japan .

*Primary Examiner*—Karl D. Frech
*Attorney, Agent, or Firm*—Lowe Hauptman Gopstein Gilman & Berner

[57] ABSTRACT

An optical character reader is provided for detecting frame lines of a character entry frame printed on a medium in which a character is written. The optical character reader includes a scanner, a frame width determining circuit, and a frame line equation defining circuit. The scanner scans the medium to produce a bit-mapped image of the medium including a character entry frame image represented with black pixels. The frame width determining circuit determines a width of the frame lines of the character entry frame based on a histogram of the number of black pixels continuously arranged over one of the frame lines in a direction perpendicular to the length of the frame lines. The frame line equation defining circuit defines line equations representing side boundaries of each of the frame lines according to a least squares method using set of pixels arranged on sides of each of the frame lines over the width of the frame lines to determine locations of the frame lines on the bit-mapped images. The character entry frame image is removed from the bit-mapped image to extract only a character image with high quality.

9 Claims, 7 Drawing Sheets

| THE NUMBER OF BLACK PIXELS | 0 | 1 | 2 | 3 | 4 | 5 | 6 | 7 | 8 OR MORE |
|---|---|---|---|---|---|---|---|---|---|
| FREQUENCY | 0 | 0 | 3 | 18 | 4 | 0 | 1 | 0 | 3 |

OPTICAL CHARACTER READER

BACKGROUND OF THE INVENTION

1. Technical Field of the Invention

The present invention relates generally to an optical character reader designed to read characters handwritten or stamped in character entry frames printed on a medium, and more particularly to an optical character reader designed to extract character images from an optically captured medium image accurately even if characters are stuck to character entry frames.

2. Background of Related Art

Optical character readers are known in the art which recognize characters handwritten or stamped on a medium such as a document. Typically, such readers isolate and extract images of characters written in character entry frames printed on a document from an optically captured document image for recognition of the characters. Therefore, in a case where the character entry frames are printed with non-dropout color, it is necessary to fill in character entry frames so that characters are not in contact with or do not partially jut out of the frames because the frames printed with the non-dropout color will be captured optically together with the characters unlike those printed with dropout color. The simple extraction of characters partially jutting out of frames, thus, leads to errors in character recognition. The removal of unwanted frame images from captured character images on the other hand results in a lack of the character images, precluding accurate character recognition.

Japanese Patent First Publication No. 3-282895 discloses an optical character reader which is designed to remove portions of character entry frames not overlapping with characters to extract only the characters accurately. This system, however, requires fine analysis of locations of the character entry frames printed on a medium, leading to complexity of logical analysis of medium images captured by an image sensor.

SUMMARY OF THE INVENTION

It is therefore a principal object of the present invention to avoid the disadvantages of the prior art.

It is another object of the present invention to provide an optical character reader which is capable of determining locations of character entry frames printed on a medium such as a document with a minimum amount of image data and extracting characters written within the character entry frames accurately.

According to one aspect of the present invention, there is provided an optical character reader for detecting frame lines of a character entry frame printed on a medium in which a character is written which comprises: (a) a scanning means for scanning the medium to produce a bit-mapped image of the medium including a character entry frame image represented with black pixels; (b) a frame width determining means for determining a width of the frame lines of the character entry frame based on a histogram of the number of black pixels continuously arranged over one of the frame lines in a direction perpendicular to the one of the frame lines; (c) a frame line equation defining means for defining line equations representing side boundaries of each of the frame lines according to a least-squares method using set of pixels arranged on sides of each of the frame lines over the width of the frame lines determined by the frame width determining means to determine locations of the frame lines on the bit-mapped images.

In the preferred mode of the invention, the optical character reader further includes (d) a character contact determining means for determining whether the character is in contact with one of the frame lines of the character entry frame or not; (e) an intersection determining means for determining an intersection of the character and one of the frame lines of the character entry frame on the bit-mapped image of the medium when the character contact determining means determines that the character is in contact with the one of the frame lines; and (f) a character-overlapped area determining means for determining a character-overlapped area of the one of the frame lines with which the character overlaps, the character-overlapped area determining means defining as the character-overlapped area a rectangular area of the bit-mapped image of the medium including the intersection determined by the intersection determining means.

According to the second aspect of the invention, there is provided an optical character reader for detecting frame lines of a character entry frame printed on a medium in which a character is written which comprises: (a) a scanning means for scanning the medium to produce a bit-mapped image of the medium; (b) a character contact determining means for determining whether the character is in contact with one of the frame lines of the character entry frame or not; (c) an intersection determining means for determining an intersection of the character and one of the frame lines of the character entry frame on the bit-mapped image of the medium when it is determined that the character is in contact with the one of the frame lines; and (d) a character-overlapped area determining means for determining a character-overlapped area of the one of the frame lines with which the character overlaps, the character-overlapped area determining means defining as the character-overlapped area a rectangular area of the bit-mapped image of the medium including the intersection determined by the intersection determining means.

According to the third aspect of the invention, there is provided an optical character reader for reading characters and character entry frames printed on a medium which comprises: (a) a scanning means for scanning the medium to produce a bit-mapped image of the medium; (b) a character/character entry frame extracting means for extracting character images and character entry frame images from the bit-mapped image of the medium; (c) a labeling means for labeling the bit-mapped image of the medium so that the same label number is added to pixels representing one of the character images; (d) a character entry frame image location determining means for determining locations of the character entry frame images on the bit-mapped image of the medium; (e) a character entry frame image removing means for removing the character entry frame images from the bit-mapped image of the medium based on the locations of the character entry frame images determined by the character entry frame image location determining means; (f) a character pattern compensating means for compensating for a character pattern omission of the character images caused by removal of the character entry frame images from the bit-mapped image of the medium based on the label numbers added to the character images; (g) a character image isolating means for isolating the character images; and (h) a character recognition means for recognizing the character images isolated by the character image isolating means using template matching.

BRIEF DESCRIPTION OF THE DRAWINGS

The present invention will be understood more fully from the detailed description given hereinbelow and from the accompanying drawings of the preferred embodiment of the invention, which, however should not be taken to limit the invention to the specific embodiment but are for explanation and understanding only.

In the drawings.

DESCRIPTION OF THE PREFERRED EMBODIMENT

Figure 1:
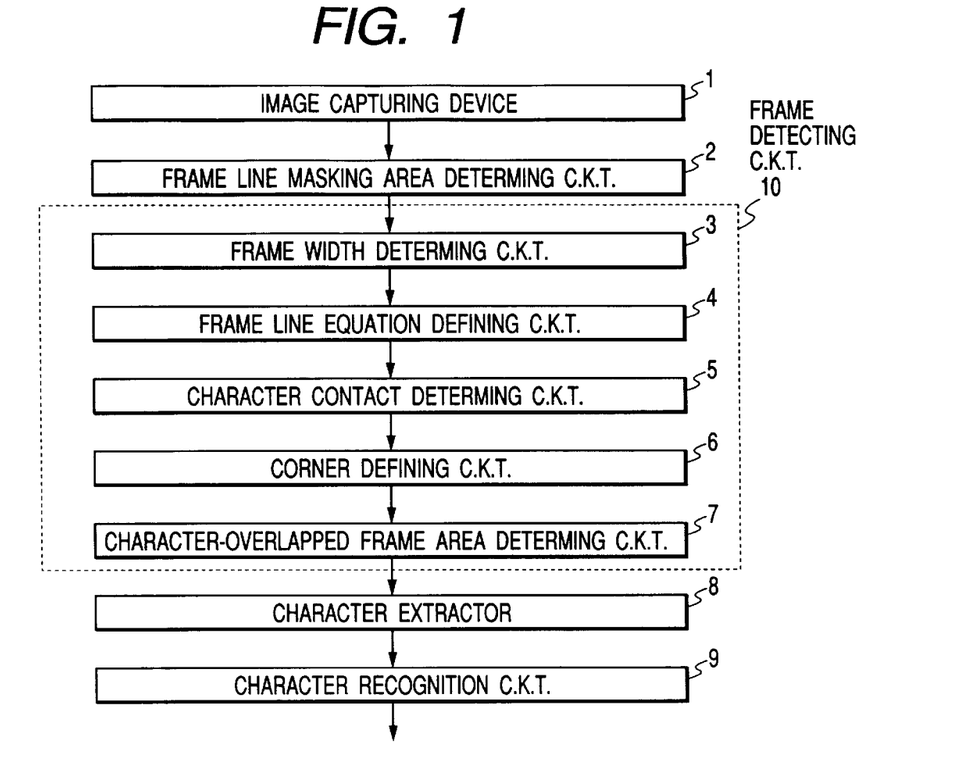
FIG. 1 is a block diagram which shows an optical character reader according to the first embodiment of the invention.

Referring now to the drawings, particularly to FIG. 1, there is shown an optical character reader according to the present invention.

The optical character reader includes generally an image capturing device 1, a frame line masking area determining circuit 2, a frame line detecting circuit 10, a character extractor 8, and a character recognition circuit 9.

The frame line detecting circuit 10 also includes a frame width determining circuit 3, a frame line equation defining circuit 4, a character contact determining circuit 5, a corner defining circuit 6, and a character-overlapped frame area determining circuit 7.

The image capturing device 1 includes a typical optical scanner which is capable of optically scanning an information-printed medium to produce a bit-mapped image of the medium. In this embodiment, the image capturing device 1 scans a document on which characters are handwritten or stamped in printed character entry frames to produce a document image including character images and frame images represented with black pixels.

The frame line masking area determining circuit 2 produces projection histograms in vertical and horizontal directions on the document scanned by the image capturing device 1 to determine locations of frame lines of the character entry frames printed on the document.

The frame line detecting circuit 10 determines the width (a constant value) and boundaries of the frame lines and determines whether or not each of the characters is stuck to one of the character entry frames.

Figure 2:
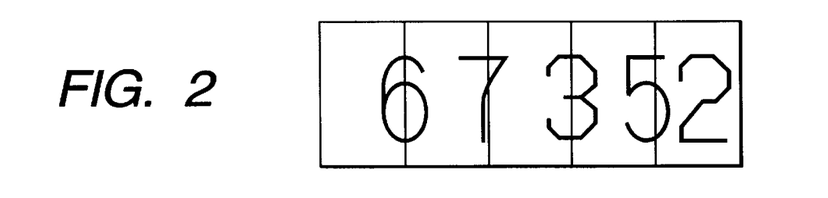
FIG. 2 is a view which shows an example of a series of characters written in character entry frames printed on a document.

FIG. 2 shows an example of a series of characters handwritten in character entry frames printed on a document. The image capturing device 1 scans the document to produce and store a document image including character and character entry frame images represented with black pixels. The frame line masking area determining circuit 2 makes vertical and horizontal projection histograms using the document image read out by the image capturing device 1 to determine locations of vertical and horizontal frame lines of the each frame. Specifically, when one of histogram values exceeds a corresponding one of vertical and horizontal frame line threshold values, it is determined that a vertical or horizontal frame line exists at a location indicated by the one of the vertical and horizontal frame line threshold values.

Figure 3:
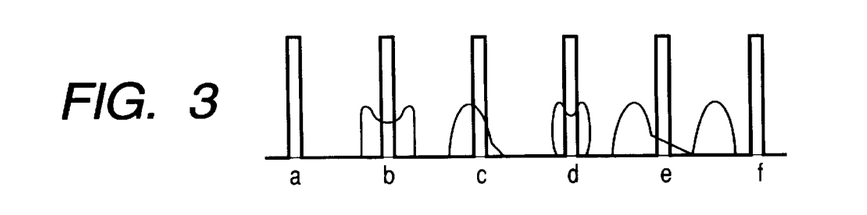
FIG. 3 is a vertical projection histogram derived by scanning the characters and the character entry frames in FIG. 2.
Figure 4:
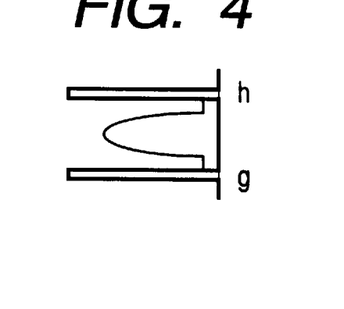
FIG. 4 is a horizontal projection histogram derived by scanning the characters and the character entry frames in FIG. 2.

FIGS. 3 and 4 show histograms of vertical and horizontal projections based on the document image derived by scanning the character entry frames and the characters in FIG. 2 through the image capturing device 1. Characters a to h indicate locations of vertical and horizontal frame lines. Each rectangle indicates an area including one of the frame lines and a given margin, which will be referred to as a frame line masking area below. The frame width determining circuit 3 counts the number of black pixels arranged continuously within each of the frame line masking areas in a direction perpendicular to the frame line to produce a black pixel histogram and determines a maximum value in the black pixel histogram as the width of the frame line.

Figure 5:
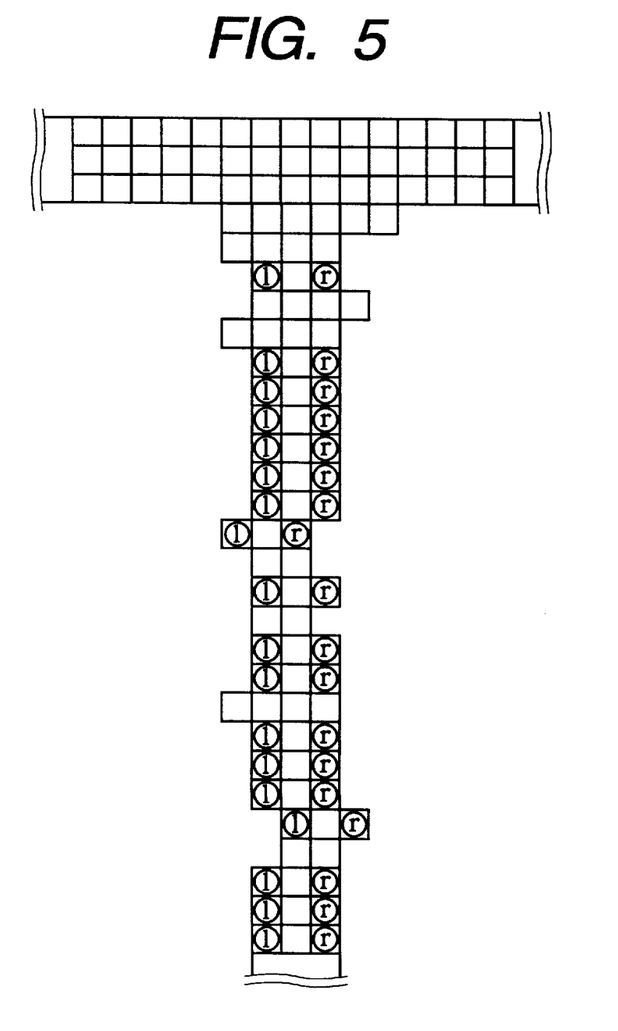
FIG. 5 is an enlarged view which shows parts of vertical and horizontal frame lines.
Figure 6:
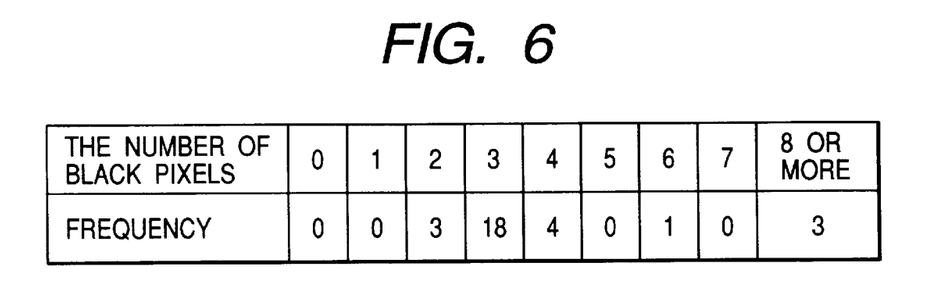
FIG. 6 is a frequency table representing the frequency that a sequence of black pixels appears in a direction perpendicular to the vertical frame line of FIG. 5.

FIG. 5 is an enlarged view showing parts of the vertical and horizontal frame lines. FIG. 6 shows a frequency table representing the frequency that a sequence of black pixels appears in a direction perpendicular to the vertical frame line of FIG. 5.

The frequency table shows that three consecutive black pixels appear most frequently. It is thus determined that the width of the frame line is three. The determination of the frame line width may alternatively be made by decimating samples in a longitudinal direction of the frame line. In this case, it becomes possible to determine the width of a broken frame line as well as a solid frame line.

The frame line equation defining circuit 4 determines equations of boundaries of the frame line based on samples over the frame line width determined by the frame line width determining circuit 3. In the example of FIG. 5, an equation of a left side boundary (i.e., a series of leftmost pixels) of the frame line is determined by the method of least squares using a set of dots "1", as enclosed by circles, to calculate an inclination and intercepts thereof. Similarly, an equation of a right side boundary (i.e., a series of rightmost pixels) of the frame line is determined by the method of least squares using a set of dots "r", as enclosed by circles, to calculate an inclination and intercepts thereof. After equations of boundaries of all the frame lines on the scanned document are determined, coordinates of vertexes of rectangles, as will be discussed in detail with reference to FIG. 7, surrounded by the left and right side boundaries of each of the vertical frame lines and the left and right side boundaries of each of the horizontal frame lines are determined as coordinates of intersections of the boundaries of the frame lines. Using these coordinates, locations of the frame lines on the document are determined.

Figure 7:
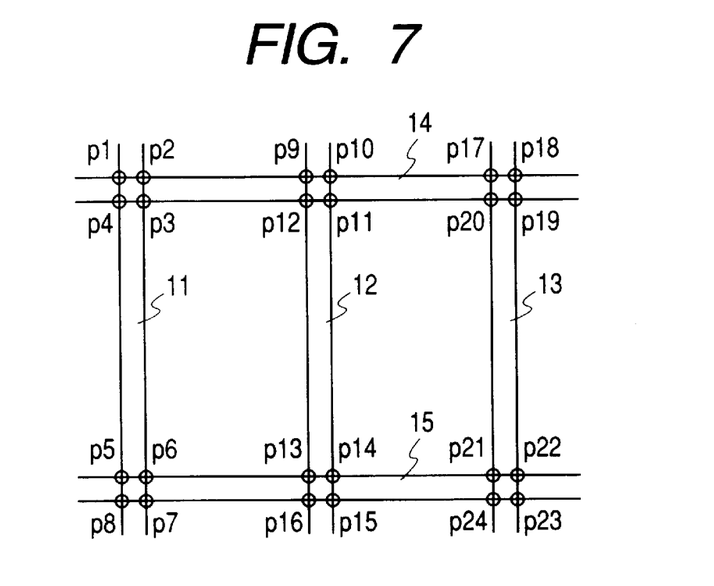
FIG. 7 is a view which shows vertical and horizontal frame line images on a document image.

FIG. 7 shows the vertical and horizontal frame lines 11 to 15 on the document image. Characters p1 to p24 indicate coordinates of vertexes of rectangles formed at intersections of the frame lines 11 to 15.

For example, a pixel area occupied by the vertical frame line 11 is a rectangle defined by the coordinates p1, p2, p7, and p8. A pixel area occupied by the horizontal frame line 14 is a rectangle defined by the coordinates p1, p18, p19, and p4.

Figure 8:
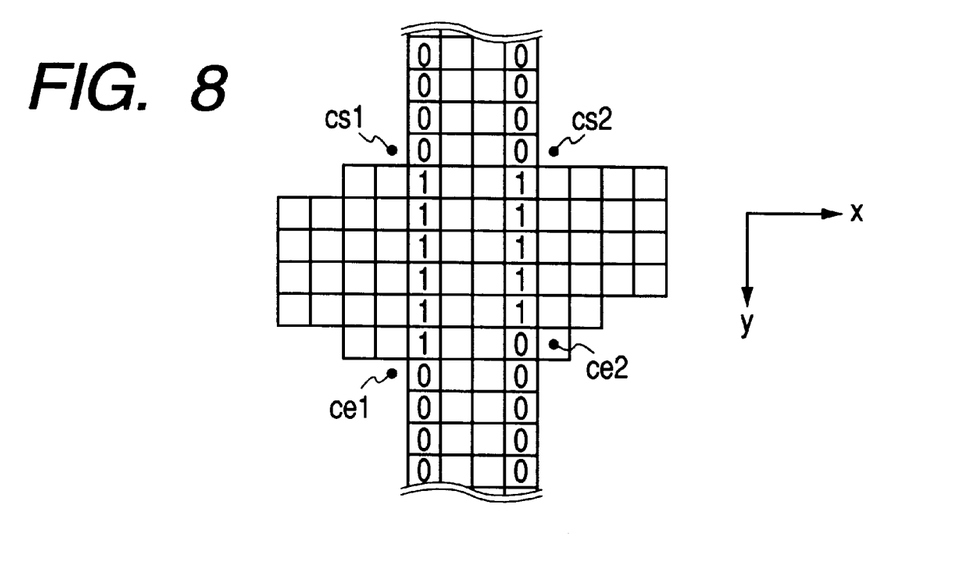
FIG. 8 is a view which shows the part of a vertical frame line with which a character overlaps.

Recognition of a character in contact with or partially jutting from a corresponding character entry frame will be described below with reference to FIGS. 8 and 9. FIG. 8 shows the part of a vertical frame line having a width of four pixels.

The character contact determining circuit 5 determines whether or not a character is stuck to or in contact with a character entry frame. When a plurality of black pixels (e.g., two black pixels) appear continuously outside one of left and right boundaries of a frame line, it is determined that the character is in contact with a frame line. In FIG. 8, "0" indicates a pixel of the frame line with which the character is not contact, and "1" indicates a pixel of the frame line with which the character is contact.

The corner defining circuit 6 defines corner dots outside intersections of the right and left boundaries of the frame line and a series of outermost pixels of the character based on the result of determination of the character contact determining circuit 5. In practice, if coordinates of the first pixel "1" following pixels "0" when each of the left and right boundaries of the frame line is scanned from top to bottom, as viewed in the drawing, are defined as (x, y), corner dots cs1 and cs2 indicating the junctions of the left and right boundaries and the uppermost pixels of the character (hereinafter, referred to as frame-to-character corner dots) are defined at coordinates (x−1, y−1) and (x+1, y−1). Additionally, if coordinates of the first pixel "0" following pixels "1" when each of the left and right boundaries of the frame line is scanned from top to bottom, as viewed in the drawing, are defined as (x, y), corner dots ce1 and ce2 indicating the junctions of the left and right boundaries and the lowermost pixels of the character (hereinafter, referred to as character-to-frame corner dots) are defined at coordinates (x−1, y1) and (x+1, y).

The character-overlapped frame area determining circuit 7 determines a portion or pixel area of the frame line with which the character overlaps based on the corner dots determined by the corner defining circuit 6.

Figure 9:
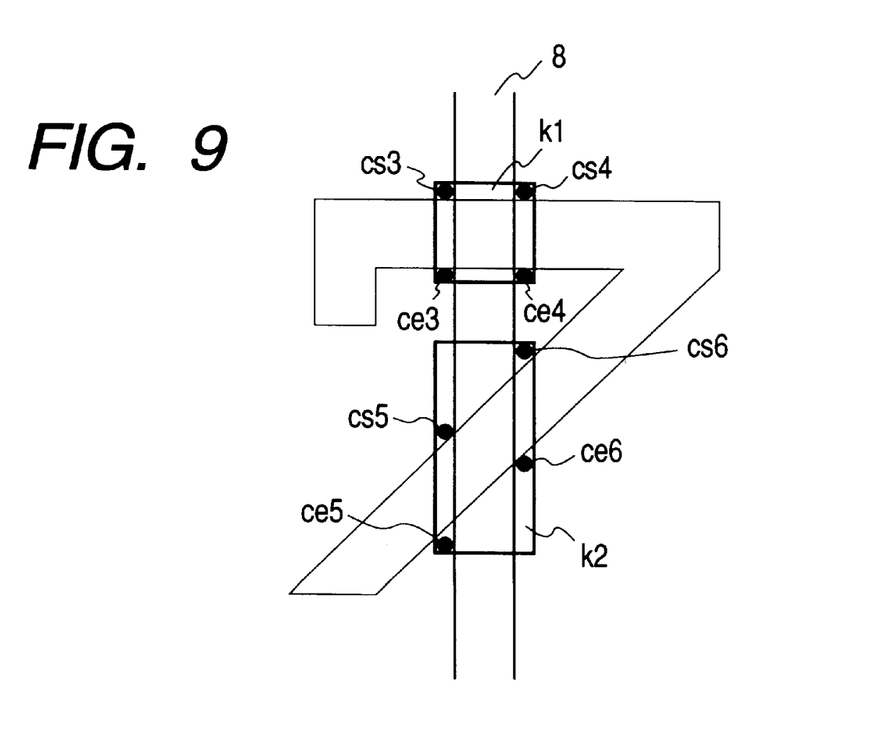
FIG. 9 is a view which shows an example of a character overlapping with a vertical frame line.

FIG. 9 shows an example of a character overlapping with the vertical frame line 8. cs3, cs4, cs5, and cs6 indicate frame-to-character corner dots, and ce3, ce4, ce5, and ce6 indicate character-to-frame corner dots determined by the corner defining circuit 6. The character-overlapped frame area determining circuit 7 produces combinations of the frame-to-character corner dots and the character-to-frame corner dots. In the example of FIG. 9, the frame-to-character corner dots cs3, cs4, cs5, and cs6 are paired with the character-to-frame corner dots ce3, ce4, ce5, and ce6, respectively. Using these corner dot combinations, rectangular pixel areas each including two of the corner dot combinations are defined and outputted as character-overlapped frame areas to the character extractor 8. In the example of FIG. 9, a rectangular pixel area k1 including the corner dots cs3, ce3, cs4, and ce4 and a rectangular pixel area k2 including the corner dots cs5, ce5, cs6, and ce6 are defined as the character-overlapped frame areas.

The character extractor 8 removes portions of the frame line other than the rectangular pixel areas k1 and k2 with which the character does not overlap from the document image to extract the character image only. This operation is performed on all the characters captured by the image capturing device 1.

The character recognition circuit 9 compares each character image extracted by the character extractor 8 with a reference character pattern (i.e., a template) to recognize each character read out by the image capturing device 1.

Figure 10:
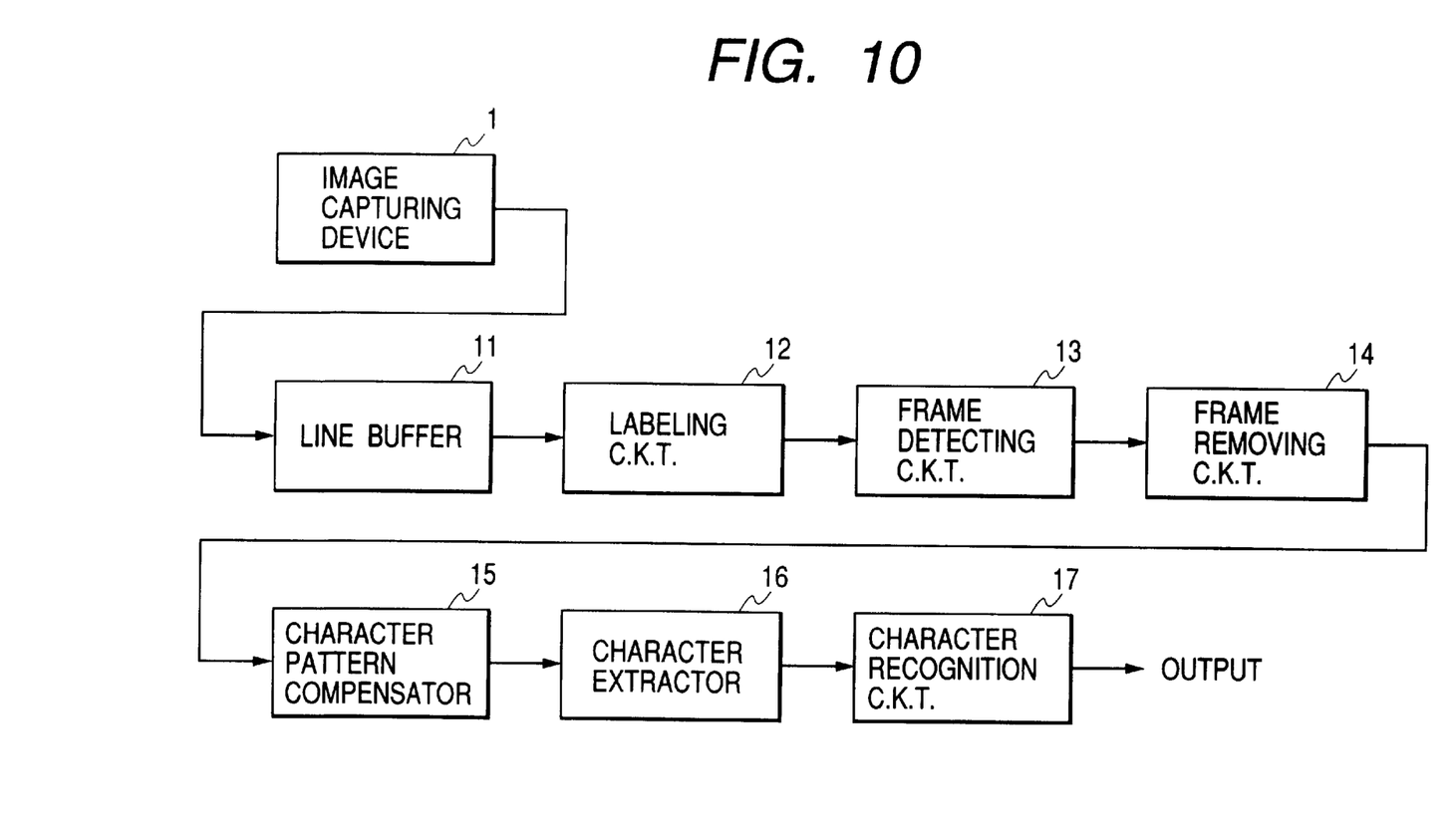
FIG. 10 is a block diagram which shows an optical character reader according to the second embodiment of the invention.

Referring to FIG. 10, there is shown an optical character reader according to the second embodiment of the invention.

The optical character reader includes an image capturing device 1, a line buffer 11, a labeling circuit 12, a frame detecting circuit 13, a frame removing circuit 14, a character pattern compensator 15, a character extractor 16, and a character recognition circuit 17.

The image capturing device 1, similar to the first embodiment, scans a document along scanning lines to capture characters and character entry frames and outputs an image signal indicative thereof.

The line buffer 11 receives the image signal outputted from the image capturing device 1 and stores a document image including character images and character entry frame images, as shown in FIG. 2, over one line on the document.

The labeling circuit 12 labels pixels of the document image so that the same label number is added to a set of pixels representing one of the character images to classify the character images.

The frame detecting circuit 13 makes vertical and horizontal projection histograms, as shown in FIGS. 3 and 4, using the document image stored in the line buffer 11 to determine locations of vertical and horizontal frame lines of each frame.

The frame removing circuit 14 removes the vertical and horizontal frame lines from the document image, leaving the character images only.

The character pattern compensator 15 compensates for omissions of the character images caused by removal of the vertical and horizontal frame lines from the document image.

The character extractor 16 extracts the character images from the document image and isolate them according to the label numbers.

The character recognition circuit 17 compares each character image extracted by the character extractor 16 with a reference character pattern (i.e., a template) to recognize each character read out by the image capturing device 1.

Figure 11:
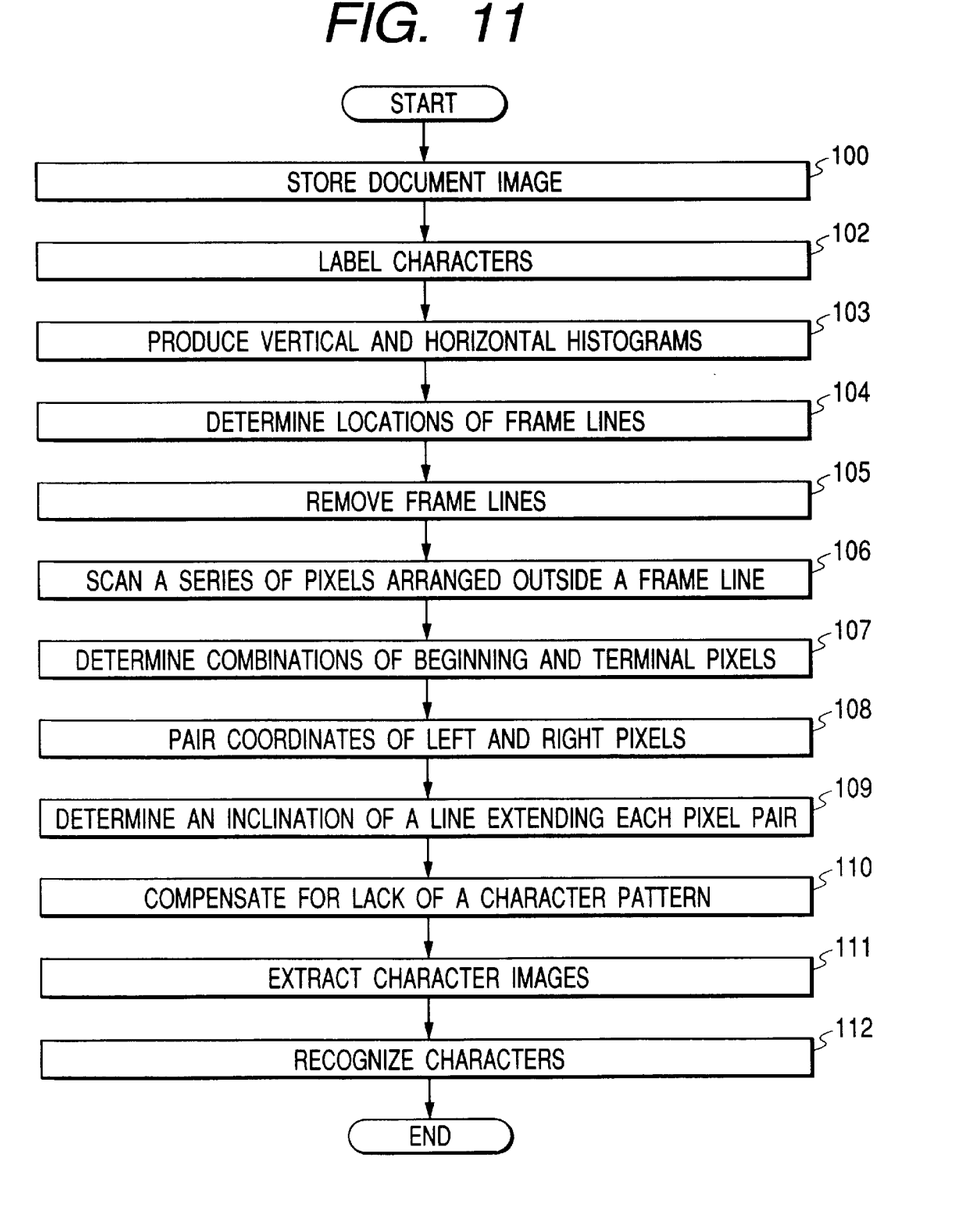
FIG. 11 is a flowchart of a program or sequence of logical steps performed by an optical character reader of the second embodiment.

FIG. 11 shows a program or sequence of logical steps performed by the optical character reader of this embodiment.

After entering the program, the routine proceeds to step 100 wherein a document image captured by scanning a given line on the document is stored in the line buffer 11.

The routine proceeds to step 102 wherein the same label number is added to continuously arranged black pixels to classify the characters.

The routine proceeds to step 103 wherein the frame detecting circuit 13 makes vertical and horizontal projection histograms using the document image stored in the line buffer 11.

The routine proceeds to step 104 wherein locations of vertical and horizontal frame lines of each frame are determined using the vertical and horizontal histograms. For example, when one of histogram values exceeds corresponding one of vertical and horizontal line threshold values, it is determined that a vertical or horizontal frame line exists at a location indicated by the one of the vertical and horizontal line threshold values.

The routine proceeds to step 105 wherein the frame removing circuit 14 removes the vertical and horizontal frame lines determined in location by the frame detecting circuit 13 from the document image to produce character images.

Figure 12:
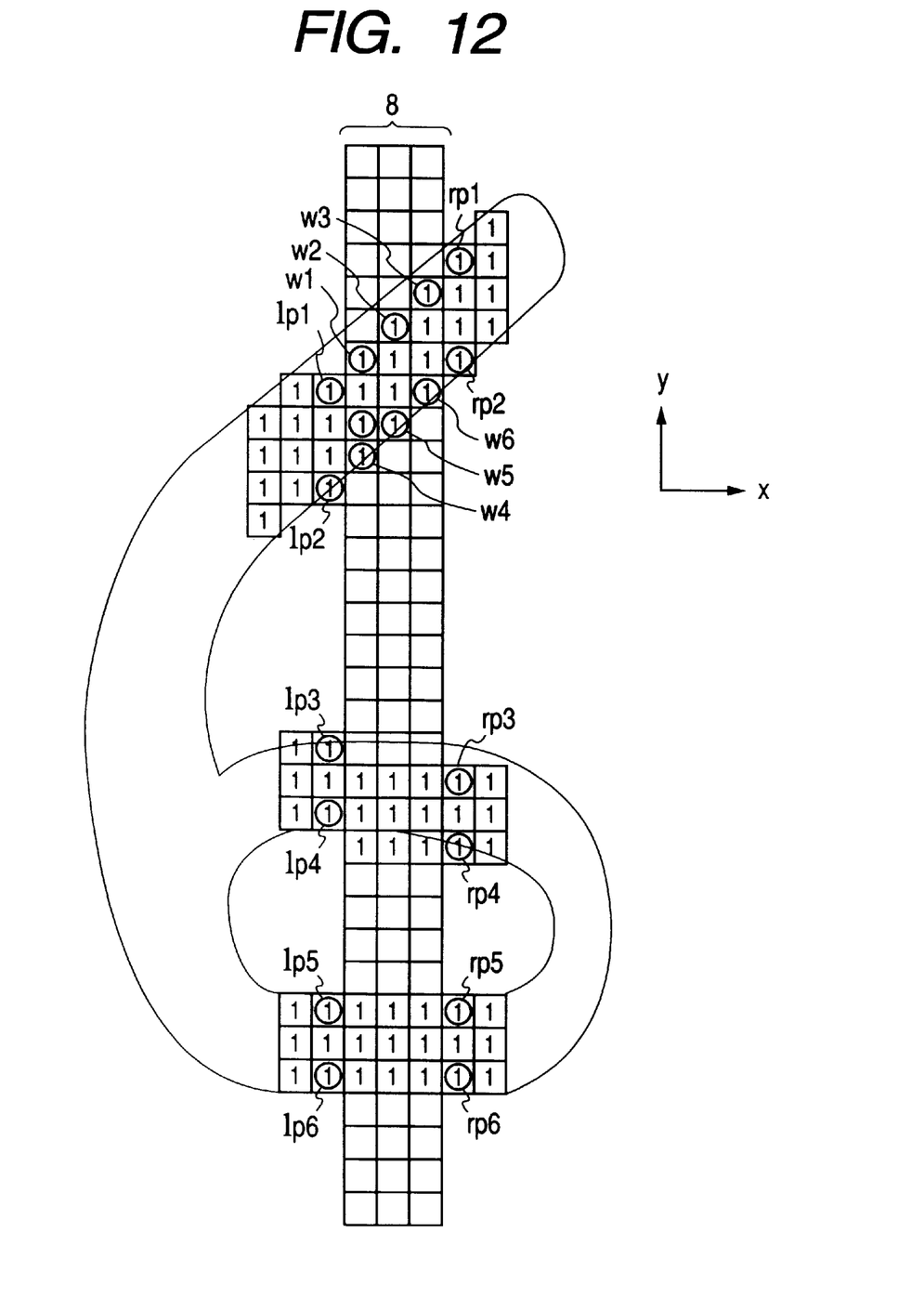
FIG. 12 is an enlarged view which shows an image of a character overlapping with a frame line.

FIG. 12 is an enlarged view showing an image of one of the characters in FIG. 2. The numeral 8 indicates a vertical frame line which is removed in step 105 by changing black pixels into white pixels. The numbers "1" added to pixels representing the character are labels given by the labeling circuit 12.

In step 106, a series of pixels aligned immediately adjacent left pixels of the vertical frame line 8 are scanned vertically. In step 107, continuous portions of the scanned pixels having the same label number (e.g., one (1) in FIG. 12) are retrieved to determine combinations of beginning and terminal pixels. In the example of FIG. 12, combinations of beginning and terminal pixels are (1p1, 1p2), (1p3, 1p4), and (1p5, 1p6). Addresses (i.e., x, y coordinates) of these pixels are stored.

Similarly, a series of pixels aligned immediately adjacent right pixels of the vertical frame line 8 are scanned vertically. Continuous portions of the scanned pixels having the same label number are retrieved to determine combinations of beginning and terminal pixels. In the example of FIG. 12, combinations of beginning and terminal pixels are (rp1, rp2), (rp3, rp4), and (rp5, rp6). Addresses (i.e., x, y coordinates) of these pixels are stored.

The routine proceeds to step 108 wherein pairs of y coordinates of the left beginning pixels 1p1, 1p3, and 1p5 and y coordinates of the right beginning pixels rp1, rp3, and rp5 which are closest to each other. In the example of FIG. 12, pairs of (1p1, rp1), (1p3, rp3), and (1p5, rp5) are determined. Similarly, pairs of the left terminal pixels 1p2, 1p4, and 1p6 and the right terminal pixels rp2, rp4, and rp6, that is, pairs of (1p2, rp2), (1p4, rp4), and (1p6, rp6) are provided.

The routine proceeds to step 109 wherein an inclination sw of a line passing through the pixels of each pair is determined based on the addresses thereof. The inclination sw is expressed with an integer (omission of decimal fraction).

The routine proceeds to step 110 wherein omissions of a character pattern are compensated for in the following manner. First, pixels lying each pair of the left and right beginning or terminal pixels along a line extending with the inclination sw determined in step 109 are translated into black pixels (e.g., label number "1", as enclosed by circles in FIG. 12). Specifically, for the pair of 1p1 and rp1, the inclination sw is determined to be one (1)=(4 vertical pixels/4 horizontal pixels). The pixels w1, w2, and w3 are translated into black pixels.

Similarly, for the pair of 1p2 and rp2, the inclination sw is determined to be one (1). The pixels w4, w5, w6 are translated into black pixels.

Next, pixels between w1 and w4, w2 and w5, and w3 and w6 are also translated into black pixels.

The above operations are performed on all the pixel pairs derived in step 108 to complete each character pattern.

While the example of FIG. 12 shows a character written over a vertical line, the above described character pattern compensation may be made for a character written over a horizontal frame line in the same manner.

The routine proceeds to step 111 wherein the character extractor 16 extracts the black pixels from the document image and classifies them into groups having different label numbers as representing different characters, respectively. In the example of FIG. 12, the black pixels having the label number "1" are extracted as representing a single character.

The routine proceeds to step 112 wherein the character recognition circuit 17 recognizes a character represented by each group of the black pixels using a typical template matching process and outputs a result of the template matching.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical character reader for detecting frame lines of a character entry frame printed on a medium in which a character is written comprising:

scanning means for scanning the medium to produce a bit-mapped image of the medium including a character entry frame image represented with black pixels;

frame width determining means for determining a width of the frame lines of the character entry frame based on a histogram of the number of black pixels continuously arranged over one of the frame lines in a direction perpendicular to the one of the frame lines; and frame line equation defining means for defining line equations representing side boundaries of each of the frame lines according to a least-squares method using set of pixels arranged on sides of each of the frame lines over the width of the frame lines determined by said frame width determining means to determine locations of the frame lines on the bit-mapped images.

2. An optical character reader as set forth in claim 1, further comprising:

character contact determining means for determining whether the character is in contact with one of the frame lines of the character entry frame or not;

intersection determining means for determining an intersection of the character and one of the frame lines of the character entry frame on the bit-mapped image of the medium when said character contact determining means determines that the character is in contact with the one of the frame lines; and character-overlapped area determining means for determining a character-overlapped area of the one of the frame lines with which the character overlaps, said character-overlapped area determining means defining as the character-overlapped area a rectangular area of the bit-mapped image of the medium including the intersection determined by said intersection determining means.

3. An optical character reader as set forth in claim 2, wherein said intersection determining means determines intersections of the character and both sides of one of the frame lines of the character entry frame and defines as the rectangular area a maximum area including at least two of the intersections as corners of the maximum area, and further comprising frame line extracting means for extracting a portion of the one of the frame lines other than the rectangular area from the bit-mapped image to extract an image of the character only.

4. An optical character reader as set forth in claim 1, wherein said frame width determining means makes vertical and horizontal projection histograms using the images produced by said scanning means to form frame line areas each including one of the frame lines of the character entry frame plus a given margin, said frame width determining means counting the number of black pixels arrayed continuously within each of the frame line areas in a direction perpendicular to a corresponding one of the frame lines to produce said histogram and determines a maximum value in said histogram in terms of a direction parallel to the corresponding one of the frame lines as the width of the one of the frame lines.

5. An optical character reader set forth in claim 1, wherein said frame line equation defining means determines an inclination and intercepts of a set of dots arrayed on each side of the width of one of the frame lines determined by said frame width determining means to define a corresponding one of the line equations.

6. An optical character reader for detecting frame lines of a character entry frame printed on a medium in which a character is written comprising:

scanning means for scanning the medium to produce a bit-mapped image of the medium;

character contact determining means for determining whether the character is in contact with one of the frame lines of the character entry frame or not;

intersection determining means for determining an intersection of the character and one of the frame lines of the character entry frame on the bit-mapped image of the medium when it is determined that the character is in contact with the one of the frame lines; and character-overlapped area determining means for determining a character-overlapped area of the one of the frame lines with which the character overlaps, said character-overlapped area determining means defining as the character-overlapped area a rectangular area of the bit-mapped image of the medium including the intersection determined by said intersection determining means.

7. An optical character reader as set forth in claim 6, wherein said intersection determining means determines intersections of the character and both sides of one of the frame lines of the character entry frame and defines as the rectangular area a maximum area including at least two of the intersections as corners of the maximum area, and further comprising frame line extracting means for extracting a portion of the one of the frame lines other than the rectangular area from the bit-mapped image to extract an image of the character only.

8. An optical character reader for reading characters and character entry frames printed on a medium comprising:

scanning means for scanning the medium to produce a bit-mapped image of the medium;

character/character entry frame extracting means for extracting character images and character entry frame images from the bit-mapped image of the medium;

labeling means for labeling the bit-mapped image of the medium so that the same label number is added to pixels representing one of the character images;

character entry frame image location determining means for determining locations of the character entry frame images on the bit-mapped image of the medium;

character entry frame image removing means for removing the character entry frame images from the bit-mapped image of the medium based on the locations of the character entry frame images determined by said character entry frame image location determining means;

character pattern compensating means for compensating for a character pattern omission of the character images caused by removal of the character entry frame images from the bit-mapped image of the medium based on the label numbers added to the character images;

character image isolating means for isolating the character images; and character recognition means for recognizing the character images isolated by said character image isolating means using template matching.

9. An optical character reader as set forth in claim 8, wherein said character pattern compensating means scans a series of pixels aligned immediately adjacent both side pixels of one of the frame lines in a direction parallel to the one of the frame lines, retrieves character portions of the bit-mapped image where the scanned pixels having the same label number are arrayed continuously to determine combinations of beginning and terminal pixels of the character portions in an scanning operation, determines a pair of the beginning pixels on both sides of the one of the frame lines which are closest to each other and a pair of the terminal pixels on both sides of the one of the frame lines which are closest to each other, determines a line passing through the pixels of each pair, and translates pixels arrayed along the determined line between the pixels of each pair into black pixels to compensate for the character pattern omission.

* * * * *